United States Patent
Choi

(10) Patent No.: US 10,716,058 B2
(45) Date of Patent: Jul. 14, 2020

(54) METHOD FOR MANAGING TERMINAL BY BASE STATION WHEN PLURALITY OF NETWORKS COEXIST

(71) Applicant: Samsung Electronics Co., Ltd., Suwon-si, Gyeonggi-do (KR)

(72) Inventor: Youngkyu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 15/118,729

(22) PCT Filed: Jan. 30, 2015

(86) PCT No.: PCT/KR2015/001028
§ 371 (c)(1),
(2) Date: Aug. 12, 2016

(87) PCT Pub. No.: WO2015/126075
PCT Pub. Date: Aug. 27, 2015

(65) Prior Publication Data
US 2017/0048791 A1    Feb. 16, 2017

(30) Foreign Application Priority Data
Feb. 18, 2014  (KR) .................. 10-2014-0018578

(51) Int. Cl.
*H04W 48/18*     (2009.01)
*H04W 36/00*     (2009.01)
(Continued)

(52) U.S. Cl.
CPC ....... *H04W 48/18* (2013.01); *H04W 36/0022* (2013.01); *H04W 72/0406* (2013.01); *H04W 88/06* (2013.01)

(58) Field of Classification Search
CPC ............. H04W 48/18; H04W 72/0406; H04W 36/0022; H04W 88/06
See application file for complete search history.

(56) References Cited

U.S. PATENT DOCUMENTS 8,767,616 B2 *   7/2014  Choi ..................... G01S 19/03
                                                           370/317
2007/0213931 A1 *  9/2007  Yoon .................... G01S 19/256
                                                           701/468
(Continued)

FOREIGN PATENT DOCUMENTS

KR    10-2008-0095028 A    10/2008
KR    10-2012-0096802 A    8/2012
(Continued)

*Primary Examiner* — Muthuswamy G Manoharan
(74) *Attorney, Agent, or Firm* — Jefferson IP Law, LLP

(57) ABSTRACT

Provided is a method for managing terminals by a base station when a plurality of networks coexist. Specifically, in a wireless communication system where a first network coexists with a second network, the terminal management method of a base station of the first network may include: receiving coexistence information from a first network management apparatus managing the base station, and examining the coexistence information; generating time information that is needed by a user equipment attached to the first network to access a third network on the basis of the coexistence information; and sending a message containing the time information to the user equipment. Thereby, it is possible to operate WiMAX and TD-LTE simultaneously while using a CDMA network for a voice service.

18 Claims, 10 Drawing Sheets

(51) Int. Cl.
  *H04W 72/04*    (2009.01)
  *H04W 88/06*    (2009.01)

(56) References Cited

U.S. PATENT DOCUMENTS

| | | | |
|---|---|---|---|
| 2010/0317378 A1* | 12/2010 | Fang | H04W 36/0022 |
| | | | 455/466 |
| 2011/0007856 A1* | 1/2011 | Jang | H04W 56/0015 |
| | | | 375/356 |
| 2012/0064884 A1 | 3/2012 | Ramachandran et al. | |
| 2013/0028201 A1 | 1/2013 | Koo et al. | |
| 2013/0128781 A1* | 5/2013 | Li | H04W 72/0446 |
| | | | 370/280 |
| 2013/0170531 A1* | 7/2013 | Adut | H03H 17/0628 |
| | | | 375/226 |
| 2013/0176997 A1* | 7/2013 | Tian | H04W 56/0085 |
| | | | 370/336 |
| 2013/0235814 A1* | 9/2013 | Wietfeldt | H04W 16/14 |
| | | | 370/329 |
| 2014/0031040 A1 | 1/2014 | Lee et al. | |
| 2014/0342740 A1 | 11/2014 | Kim et al. | |
| 2016/0050624 A1* | 2/2016 | Tirronen | H04W 52/0216 |
| | | | 370/311 |

FOREIGN PATENT DOCUMENTS

| | | |
|---|---|---|
| WO | 2013-019182 A1 | 2/2013 |
| WO | 2013-112005 A1 | 8/2013 |
| WO | 2014-017872 A1 | 1/2014 |

\* cited by examiner

FIG. 2

SystemInformationBlockType8 information element
-- ASN1START

```
SystemInformationBlockType8 ::=    SEQUENCE {
    systemTimeInfo                     SystemTimeInfoCDMA2000                OPTIONAL,
-- Need OR
    searchWindowSize                   INTEGER (0..15),
-- Need OR
    parametersHRPD                     SEQUENCE {
        preRegistrationInfoHRPD            preRegistrationInfoHRPD,
        cellReselectionParametersHRPD      CellReselectionParametersCDMA2000     OPTIONAL
-- Need OR
```

SystemTimeInfoCDMA2000 information element
-- ASN1START

```
SystemTimeInfoCDMA2000 ::=         SEQUENCE {
    cdma-EUTRA-Synchronisation         BOOLEAN,
    cdma-SystemTime                    CHOICE {
        synchronousSystemTime              BIT STRING (SIZE (39)),
        asynchronousSystemTime             BIT STRING (SIZE (49))
    }
}
```

-- ASN1STOP

METHOD FOR MANAGING TERMINAL BY BASE STATION WHEN PLURALITY OF NETWORKS COEXIST

TECHNICAL FIELD

The present invention relates to a method for a base station to manage a terminal in a system where multiple networks coexist. More particularly, the present invention relates to a method that enables a base station to manage a terminal and enables a terminal to access a network in a system where WiMAX and TD-LTE coexist.

BACKGROUND ART

Wireless communication networks have been extensively deployed to provide various communication content such as voice, video, packet data, messaging or broadcast services. Wireless communication networks may be multiple access networks that share available network resources to support many users. The multiple access networks may include a Code Division Multiple Access (CDMA) network, Time Division Multiple Access (TDMA) network, Frequency Division Multiple Access (FDMA) network, Orthogonal Frequency-Division Multiple Access (OFDMA) network, and Single Carrier FDMA (SC-FDMA) network. A user equipment (UE) may be placed in the coverage of multiple wireless communication networks capable of supporting different communication services. A suitable one of the wireless communication networks may be selected to serve the UE according to one or more criteria.

Circuit Switched Fallback (CSFB) refers to a technology that enables a UE placed in a cell of the LTE Evolved Universal Terrestrial Access Network (E-UTRAN) to receive circuit switched (CS) services (e.g. voice service, video service, SMS service, location service, and Unstructured Supplementary Service Data (USSD)) by use of CS domain network resources (e.g. Mobile Switching Center (MSC) or MSC server).

Meanwhile, one or more wireless networking schemes may use adjacent frequencies of the same frequency band. When multiple wireless networking schemes coexist, it is necessary to develop a method for providing time information to a user equipment for CSFB.

DISCLOSURE OF INVENTION

Technical Problem

The present invention has been made in view of the above problem. Accordingly, an aspect of the present invention is to provide a method that enables a base station to manage a user equipment when multiple networks coexist.

Solution to Problem

In accordance with an aspect of the present invention, there is provided a method of terminal management for a base station of a first network in a wireless communication system where the first network coexists with a second network. The method may include: receiving coexistence information from a first network management apparatus managing the base station, and examining the coexistence information; generating time information that is needed by a user equipment attached to the first network to access a third network on the basis of the coexistence information; and sending a message containing the time information to the user equipment.

In accordance with another aspect of the present invention, there is provided a base station of a first network performing terminal management in a wireless communication system where the first network coexists with a second network. The base station may include: a command handler to examine coexistence information received from a network management apparatus managing the base station, and to generate time information that is needed by a user equipment attached to the first network to access a third network on the basis of the coexistence information; a message generator to generate a message containing system information of the third network to be sent to the user equipment; and a time information inserter to add the time information to the message and to send the message to the user equipment.

In accordance with another aspect of the present invention, there is provided a method of accessing a third network for a user equipment attached to a first network in a wireless communication system where the first network coexists with a second network. The method may include: receiving a message containing time information of the third network from a base station of the first network; checking whether the time information is based on an asynchronous system time parameter of System Information Block 8 (SIB-8); and storing the time information in the user equipment as time information needed for accessing the third network.

In accordance with another aspect of the present invention, there is provided a user equipment attached to a first network in a wireless communication system where the first network coexists with a second network. The user equipment may include: a wireless communication unit to receive a message containing time information of the third network from a base station of the first network; a control unit to check whether the time information contained in the message is based on an asynchronous system time parameter of System Information Block 8 (SIB-8); and a storage unit to store the checked time information as time information needed for accessing the third network.

Advantageous Effects of Invention

In a feature of the present invention, it is possible to operate WiMAX and TD-LTE simultaneously while using a CDMA network for a voice service.

In another feature, CSFB or eCSFB may still be utilized even when coexistence information about WiMAX and TD-LTE is changed.

In another feature, the high-layer voice call handling block may generate SIB-8 messages only according to a fixed period regardless of specific operations of the lower layer.

BRIEF DESCRIPTION OF DRAWINGS

FIG. 2 illustrates system time information in the SIB-8 message.

MODE FOR THE INVENTION

Figure 1:
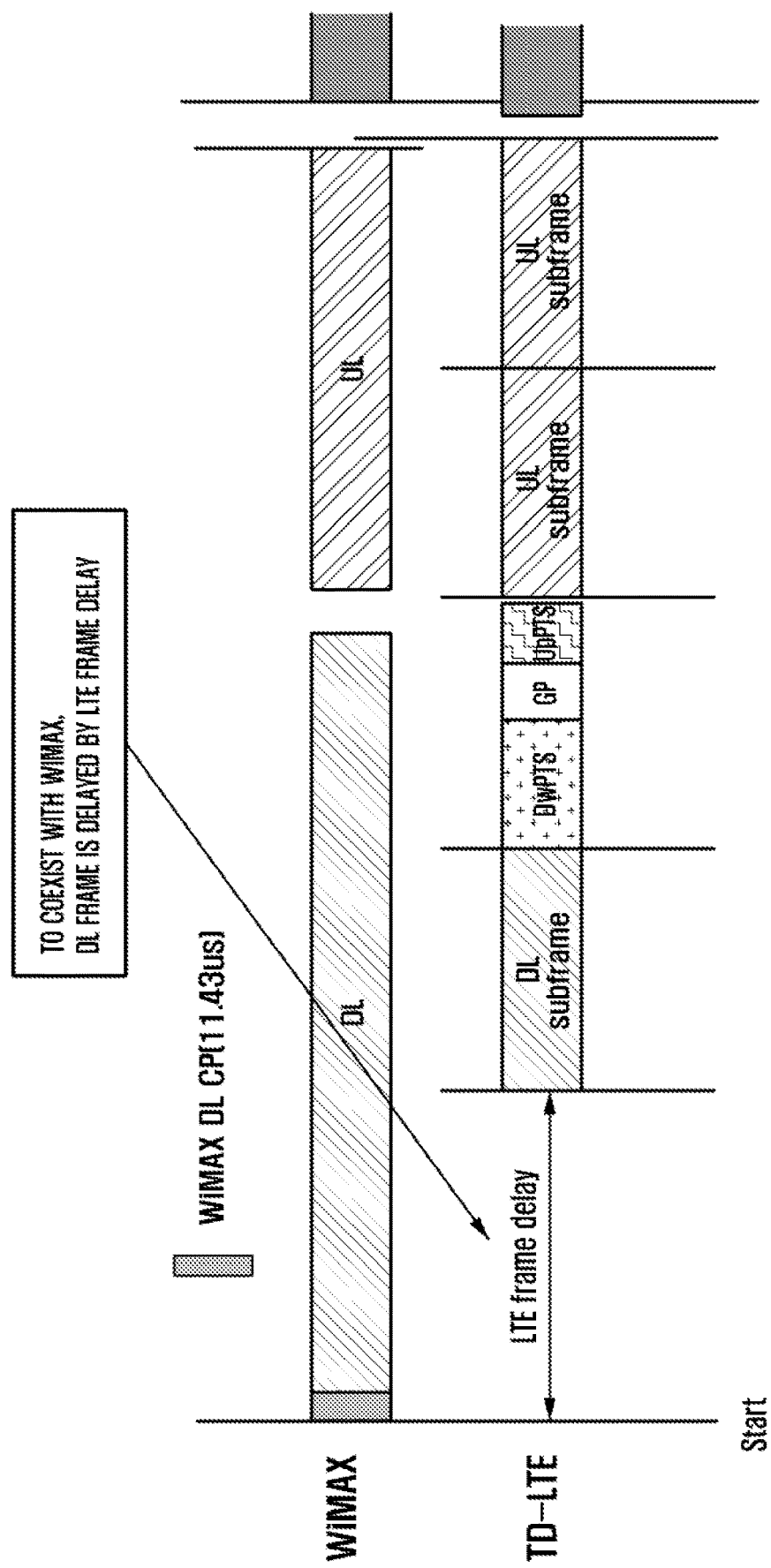
FIG. 1 illustrates a situation where WiMAX and TD-LTE coexist.

Hereinafter, exemplary embodiments of the present invention are described in detail with reference to the accompanying drawings. It should be understood that the description of specific embodiments is not intended to limit the invention to the particular forms disclosed, but is intended to cover all modifications, equivalents, and alternatives falling within the spirit and scope of the invention.

The same or similar reference symbols are used throughout the drawings to refer to the same or like parts. Descriptions of well-known functions and structures incorporated herein may be omitted to avoid obscuring the subject matter of the present invention.

Descriptions of functions and structures well known in the art and not directly related to the present invention may also be omitted for clarity and conciseness.

The present invention may be applied to various wireless communication systems based on, for example, CDMA, TDMA, FDMA, OFDMA and SC-FDMA. The words "system" and "network" are often used interchangeably. A CDMA system may implement a radio technology such as Universal Terrestrial Radio Access (UTRA) or CDMA2000. UTRA may include wideband CDMA (WCDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, or Flash-OFDM. UTRA and E-UTRA are part of Universal Mobile Telecommunications System (UMTS). 3GPP Long Term Evolution (LTE) is an upcoming release of UMTS, which employs OFDMA on the downlink and SC-FDMA on the uplink. In addition, such wireless communication systems may additionally include peer-to-peer (e.g. mobile-to-mobile) ad hoc network systems, which open utilize unpaired unlicensed spectrums, 802.xx wireless LAN, Bluetooth, or other short-range or long-range wireless communication technologies.

Embodiments of the present invention are described in connection with a user equipment (UE). The user equipment may be referred to as a terminal, system, subscriber unit, subscriber station, mobile station, mobile, remote station, remote terminal, mobile device, user terminal, wireless communication device, user agent, or user device. The user equipment may be a cellular phone, personal digital assistant (PDA), hand-held or computing device capable of radio access, or processing device connected to a wireless modem.

Embodiments of the present invention are also described in connection with a base station. The base station may be referred to as an access point, node B, evolved node B (eNB), or the like.

In the description, the terms "component", "system", "module", and the like may refer to a computer-related entity, hardware, firmware, a combination of hardware and software, software, or software in execution. For example, a component may be, but is not limited to being, a process running on a processor, a processor, an object, an executable file, a thread of execution, a program, and/or a computer. One or more components may reside within a process and/or a thread of execution, and a component may be localized on one computer or distributed between two or more computers. Components can be executed from various computer readable media with various stored data structures. Components may communicate with each other via local and/or remote processes in accordance with, for example, a signal having one or more data packets (e.g., data from one component interacting with another component in a local system or distributed system, or data from a component interacting with other systems through a network such as the Internet).

It should be noted that technical terms used herein are merely used to describe a specific embodiment without limiting the spirit of the invention. Also, unless particularly defined otherwise, technical terms used herein should be interpreted as having a meaning that is generally understood by those having ordinary skill in the art to which the invention pertains, and should not be construed too broadly or too narrowly.

In the description, the singular forms "a", "an", and "the" include plural referents unless the context clearly dictates otherwise. In addition, use of the terms "including," "comprising," "having," and variations thereof is meant to encompass the items (e.g. components or steps) listed thereafter and equivalents thereof as well as additional items.

Next, embodiments of the present invention are described in detail with reference to the drawings.

For ease of description, different types of networks used in the present invention may be referred to as a first network, a second network, and a third network.

In the following description, it is assumed that the first network is a TD-LTE network, the second network is a WiMAX network, and the third network is a CDMA network.

FIG. 1 illustrates a situation where WiMAX and TD-LTE coexist.

In the description, the term "coexistence" may indicate a situation where different networks use adjacent frequencies of the same frequency band. For example, this may indicate a situation where WiMAX and TD-LTE networks use adjacent frequencies of the same frequency band.

In time division duplex (TDD) systems such as WiMAX and TD-LTE, when downlink (DL) and uplink (UL) transmissions overlap, system performance may be degraded owing to interference.

When two TDD systems coexist in the same frequency band, it is necessary to synchronize downlink and uplink transmissions as much as possible so as to prevent system performance degradation. Specifically, it is possible to make the two TDD systems have matching downlink/uplink subframe structures as much as possible, and to apply a delay at the beginning of the frame in the LTE system. Additionally, puncturing may be applied to a non-matching OFDM symbol duration so that this time is not used by either LTE or WiMAX but is used for radio frequency (RF) switching between downlink and uplink (DL to UL or UL to DL).

Thereby, when the two systems are operated by the same base station at the same site, DL-UL adjacent channel interference is not caused.

FIG. 1 depicts a WiMAX frame structure in the case of a DL:UL ratio of 29:18 (29:18 DL:UL configuration). Here, it can be seen that, under the assumption of TD-LTE configuration #1, application of LTE frame delay at the beginning of the TD-LTE part makes downlink and uplink durations of WiMAX and TD-LTE nearly coincide.

Meanwhile, Circuit Switched Fallback (CSFB) is a technology that enables a UE placed in a cell of the LTE Evolved Universal Terrestrial Access Network (E-UTRAN) to receive circuit switched (CS) services (e.g. voice service, video service, SMS service, location service, and Unstructured Supplementary Service Data (USSD)) by use of CS domain network resources (e.g. Mobile Switching Center (MSC) or MSC server).

In one embodiment, the terminal management scheme of the base station may be applied when voice services are provided through the CDMA 1×RTT system and data services are provided through the LTE system. In this case, as soon as a voice service is initiated by the network or user equipment, the user equipment performs connection switching from the LTE network to the CDMA network.

The user equipment may identify the system time of the CDMA network by use of a system information block type 8 (SIB-8) message broadcast by the LTE network.

FIG. 2 illustrates system time information in the SIB-8 message.

Referring to FIG. 2, the UE may obtain the CDMA system time from a system information block type 8 (SIB-8) message broadcast by the LTE network and read the neighbor CDMA synchronization signal according to the CDMA system time for call setup. The LTE system operates in synchronous mode with a period or granularity of 10 ms by default regardless of TDD or FDD. In SystemTimeInfo of FIG. 2, cdma-EUTRA-Synchronization may be set to "true" (Boolean) and SynchronousSystemTime of 39 bits may be selected.

Figure 3:
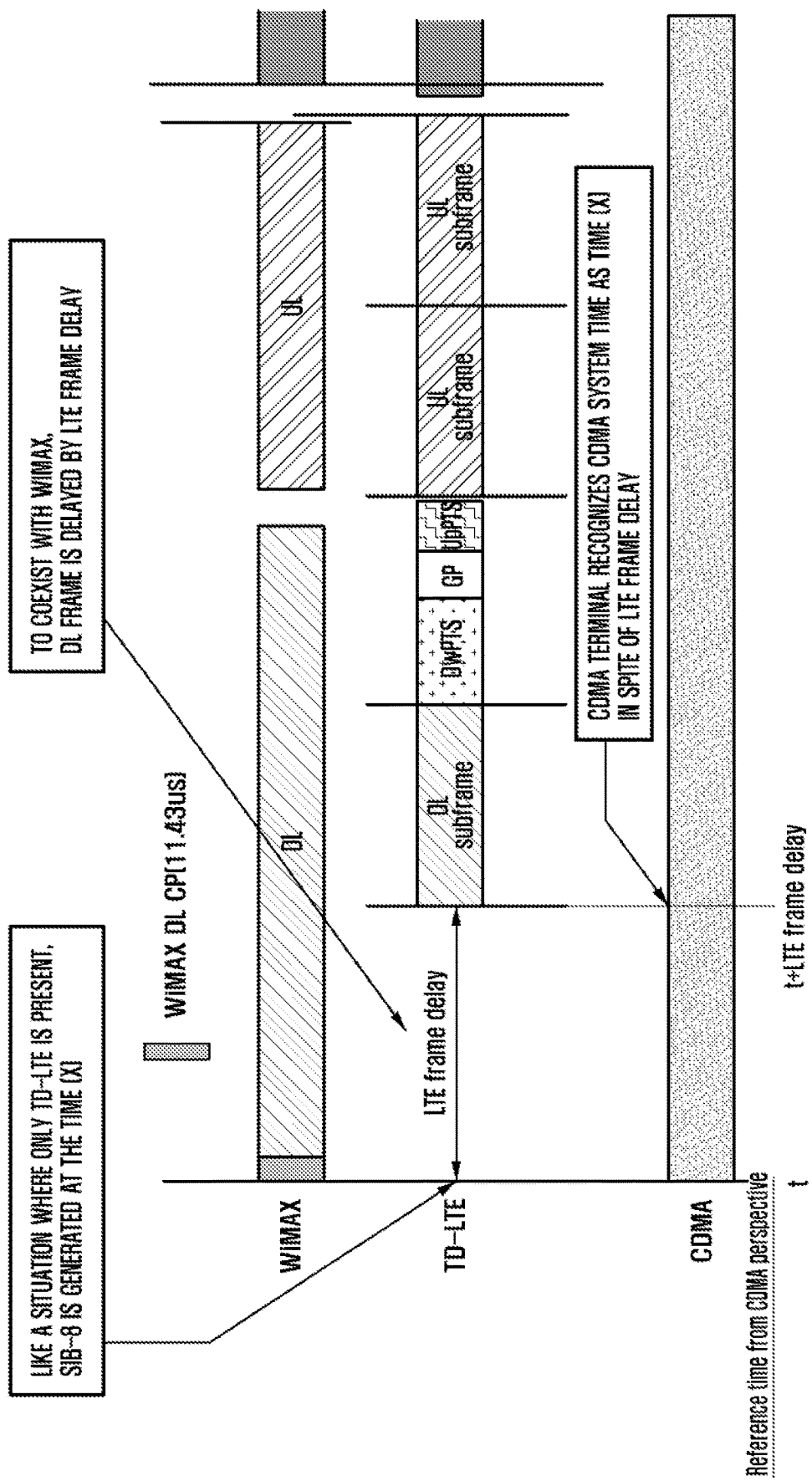
FIG. 3 illustrates supply of time information for CSFB to a user equipment when WiMAX and TD-LTE coexist.

FIG. 3 illustrates supply of time information for CSFB to a user equipment when WiMAX and TD-LTE coexist.

In FIG. 3, frame delay is applied to the TD-LTE system for coexistence of WiMAX and TD-LTE. In this case, when the system time is represented in a synchronous format with a size of 39 bits, the CDMA system time recognized by a CDMA terminal may be in error by the LTE frame delay.

Specifically, the TD-LTE and CDMA systems operating according to GPS synchronization signals may generate SIB-8 messages at the same time with respect to corresponding time information without regard to coexistence with the WiMAX system. However, transmission of the SIB-8 message may be delayed by the LTE frame delay according to the scheme for WiMAX and TD-LTE coexistence. Hence, the system time recognized by a CDMA terminal may differ by the LTE frame delay in comparison to the time recognized by the neighbor CDMA base station. In this case, if the LTE frame delay is very small enough to be less than the search window size of the CDMA terminal, there may be no problem. However, while the LTE frame delay is determined in the vicinity of 1 ms (1 LTE subframe), the maximum search window size of a CDMA terminal is 452 PN chips (about 0.367 ms). So, the user equipment may be unable to properly receive CDMA signals, failing in a voice call service.

Embodiment 1

The first embodiment of the present invention relates to a terminal management scheme for the base station when WiMAX and TD-LTE coexist.

Specifically, the first embodiment of the present invention relates to correction of the SIB-8 system time in consideration of the LTE frame delay.

Figure 4:
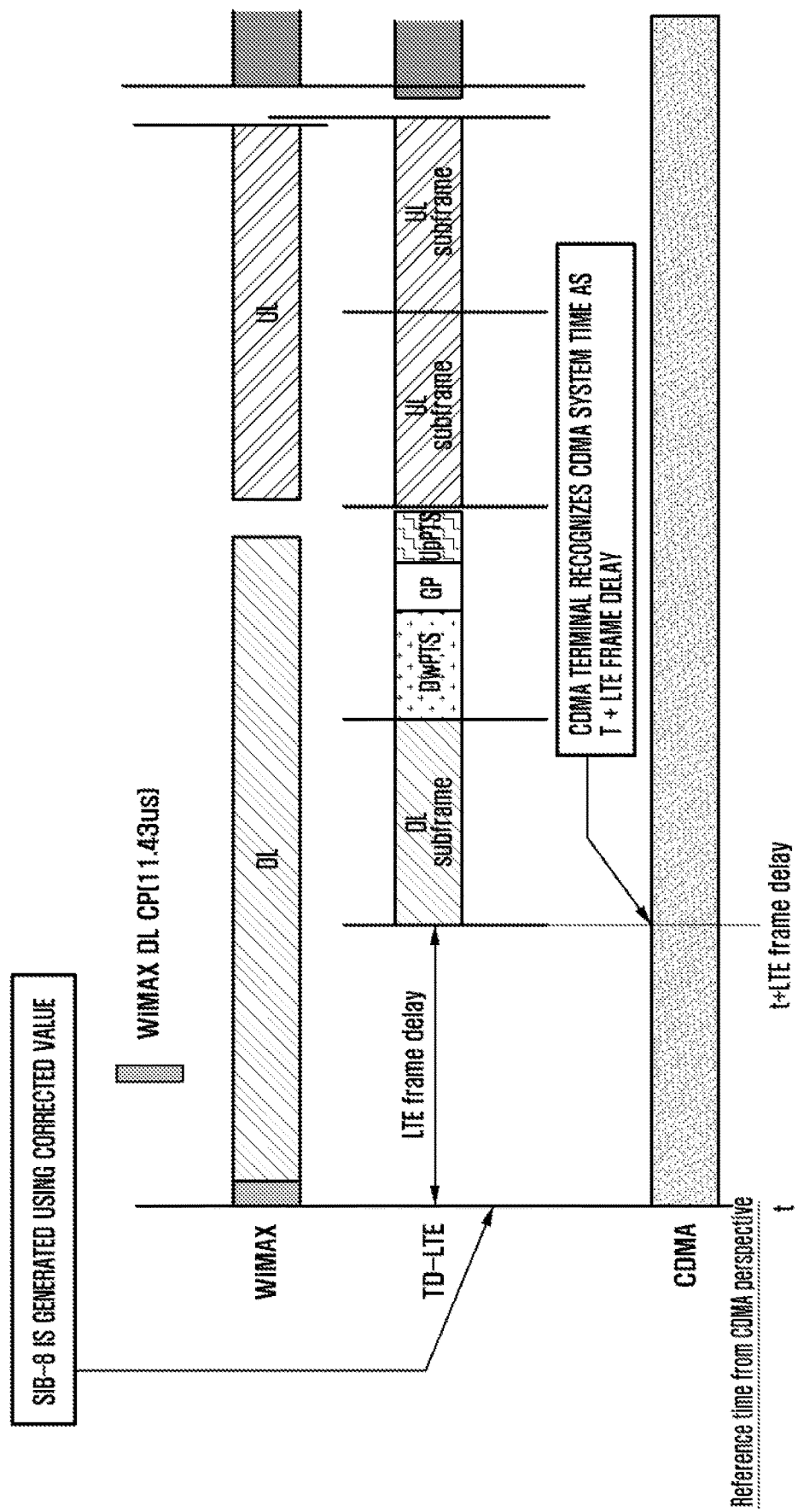
FIG. 4 illustrates supply of time information to a user equipment in a terminal management scheme of the base station according to an embodiment of the present invention.

FIG. 4 illustrates supply of time information to a user equipment in a terminal management scheme of the base station according to an embodiment of the present invention.

When WiMAX and TD-LTE coexist, SIB-8 transmission is delayed by the LTE frame delay. In this case, when the LTE frame delay is not reflected in the system time indicated by the SIB-8 message and recognized by a CDMA terminal, the terminal may fail to receive CDMA signals. Hence, the system time should be corrected in consideration of the LTE frame delay. However, although the system time is corrected in consideration of the actual transmission time of the SIB-8 message, the existing synchronous system time format may be unable to represent "the current time (t)+LTE frame delay".

As the default synchronous system time format has a resolution of 10 ms (or the unit), it cannot accurately represent a value less than 10 ms. In other words, when the synchronous system time format is used, if the LTE frame delay is less than 10 ms, the representation of "the current time (t)+LTE frame delay" will be identical to that of "the current time (t)".

Therefore, to represent the corrected system time reflecting the LTE frame delay, the asynchronous system time format is used in the present invention. Here, the unit (time resolution) is 8 CDMA chips based on 1.2288 Mcps chip rate, and 8 CDMA chips correspond to 6.51 µs (1/1.2288*8 µs).

The asynchronous system time format may adequately represent the system time reflecting the LTE frame delay. In this regard, referring to SystemTimeInfo of FIG. 2, cdma-EUTRA-Synchronization may be set to "false" and AsynchronousSystemTime of 49 bits may be selected.

The corrected SIB-8 time information may be represented in an asynchronous format as shown in Equation 1.

$$\text{Time information} = \text{asynchronousSystemTime} = \text{floor}((\text{current\_time}(t) + \text{LTE\_frame\_delay}) \times 1.2288 \times 10^6/8) \bmod 2^{49} = \text{asynchronous\_current\_time}(t\_\text{asynch}) + \text{floor}(\text{LTE\_frame\_delay} \times 1.2288 \times 10^6/8) \bmod 2^{49} \quad \text{Equation 1}$$

here, Current_time(t) indicates the GPS reference time in seconds, and LTE_frame_delay indicates the LTE frame delay in seconds. The system time in the existing system may be represented in the asynchronous format (t_asynch).

For example, when the LTE frame delay is 1.053 ms, the corrected asynchronous system time (asynchronousSystemTime) will be 161 (=floor(1.053*1.2288*1000/8)). When the LTE frame delay is 0.9796 ms, the corrected asynchronous system time (asynchronousSystemTime) will be 150 (=floor (0.9796*1.2288*1000/8).

Thereby, as shown in FIG. 4, the user equipment may identify the system time aligned with the SIB-8 reception time by use of a SIB-8 message.

Figure 5:
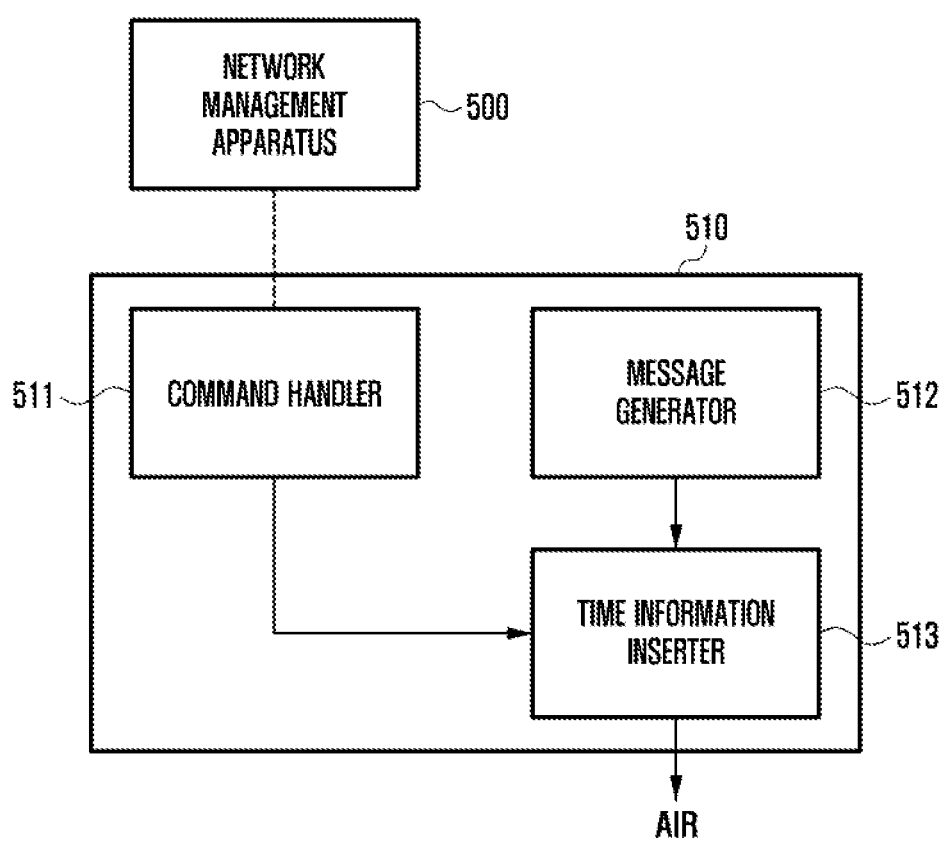
FIG. 5 is a block diagram of a base station managing terminals according to an embodiment of the present invention.

FIG. 5 is a block diagram of a base station managing terminals according to an embodiment of the present invention.

Figure 6:
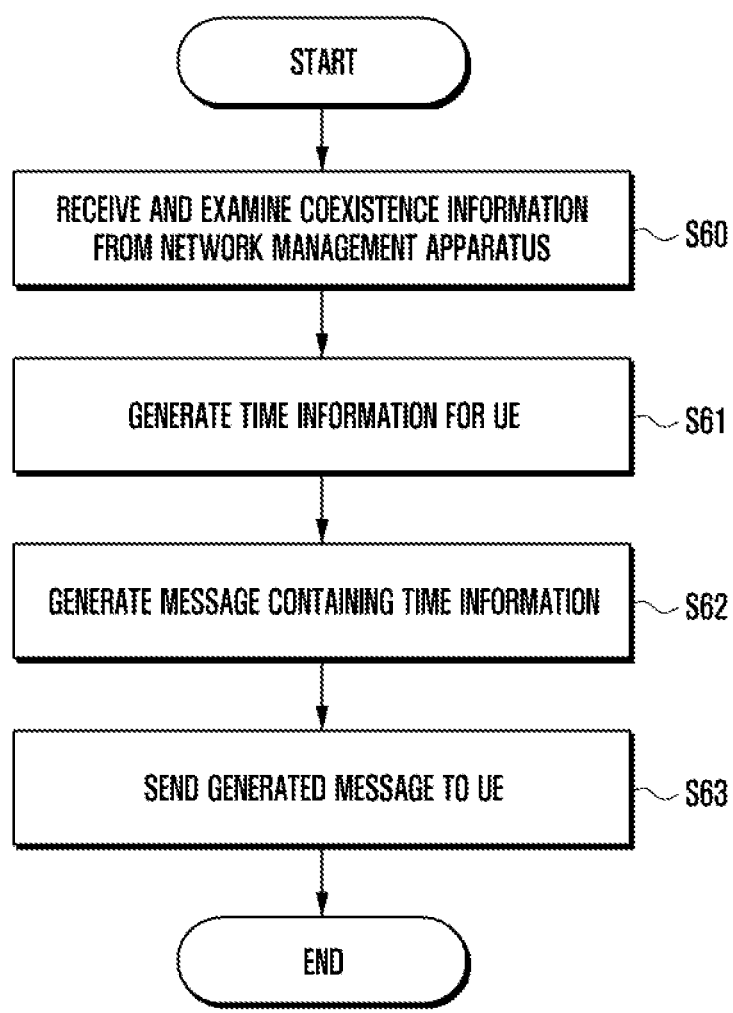
FIG. 6 is a flowchart of a procedure for the base station to manage terminals according to an embodiment of the present invention.

FIG. 6 is a flowchart of a procedure for the base station to manage terminals according to an embodiment of the present invention.

Next, a detailed description is given of the configuration and operation of the base station managing terminals with reference to FIGS. 5 and 6.

Referring to FIG. 5, the base station 510 may include a command handler 511, a message generator 512, and a time information inserter 513.

The network management apparatus 500 may be the element management system (EMS) managed by the network operator.

The WiMAX network and TD-LTE network may coexist in various ways according to WiMAX DL/UL symbol configurations and puncturing schemes. Here, the LTE frame delay applied to the TD-LTE network may be altered according to the forms of coexistence.

At step S60, the base station 510 receives coexistence information from the network management apparatus 500.

The coexistence information may include a coexistence indicator indicating coexistence of WiMAX and TD-LTE, information on the DL/UL configuration indicating the coexistence mode, and information on the LTE frame delay corresponding to the coexistence mode.

At step S61, the command handler 511 of the base station 510 verifies the coexistence information received from the network management apparatus 500 and generates time information for a UE wishing to access the CDMA network for CSFB on the basis of the coexistence information.

The message generator 512 may generate a message containing CDMA system information to be sent to the UE. The information generated by the message generator 512 may include System Information Block.

The time information inserter 513 may add the time information generated by the command handler 511 to the message generated by the message generator 512. The message to which time information is added may be, but not limited to, of System Information Block (SIB) Type 8.

The time information may be based on an asynchronous system time parameter of SIB-8. The time information may be determined by the current time (the GPS reference time for SIB-8 message generation) and the LTE frame delay.

At step S63, the base station 510 sends the message containing the time information to the UE.

The message containing time information may be sent to a specific UE or may be broadcast to UEs.

Embodiment 2

In one embodiment of the present invention, when coexistence information from the network management apparatus 500 is changed, the base station managing a UE may send the UE time information reflecting the changed coexistence information.

Figure 7:
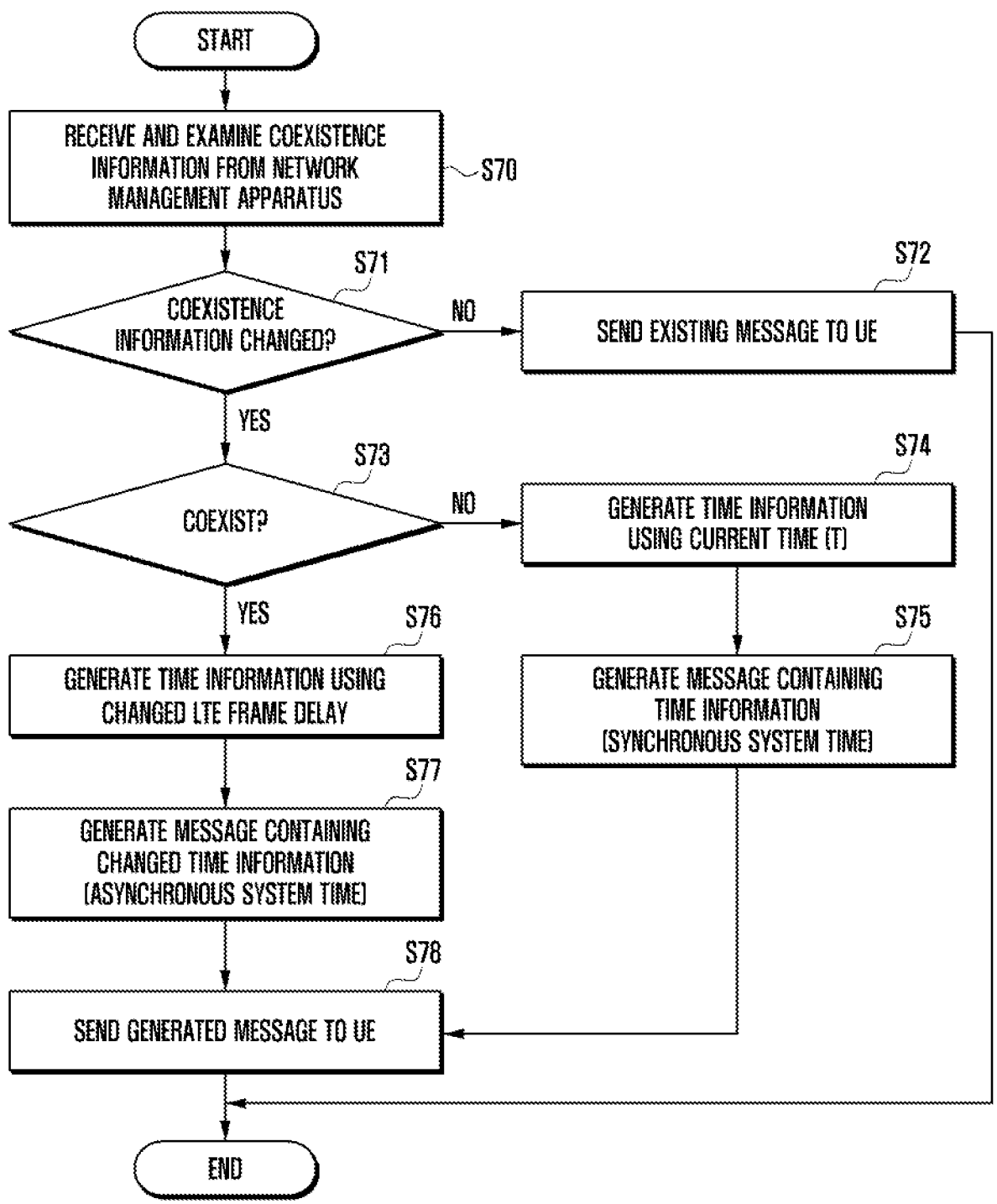
FIG. 7 is a flowchart of a procedure for the base station managing terminals when the coexistence information is changed.

FIG. 7 is a flowchart of a procedure for the base station managing terminals when the coexistence information is changed.

Coexistence of WiMAX and TD-LTE may be altered according to the DL/UL ratio and puncturing of WiMAX. That is, when the DL/UL ratio of WiMAX is changed, the LTE frame delay to be applied to TD-LTE may be changed accordingly, and thereby coexistence mode is changed.

In this case, when a change in the LTE frame delay is not reflected in the system time, the UE may fail to properly receive CDMA signals. That is, the UE may fail to provide a voice call service.

When coexistence information is received from the network management apparatus 500, at step S71, the base station 510 checks whether the received coexistence information is identical to the previous coexistence information.

Thereby, when the coexistence information is changed, it is possible to send system time reflecting a change in the LTE frame delay.

Next, a detailed description is given of operations in the case of a change in the coexistence information.

Referring to FIG. 7, a change in the coexistence mode of WiMAX and TD-LTE may correspond to a change in the WiMAX DL/UL configuration. That is, when the WiMAX DL/UL configuration is changed, the DL/UL ratio is changed accordingly, and thereby start positions of DL/UL intervals are changed. In this case, for coexistence with TD-LTE, a proper LTE frame delay is to be found for the TD-LTE network.

Hence, a change in WiMAX DL/UL configuration may entail a change in the coexistence mode, i.e., a change in the LTE frame delay.

At step S70, the base station 510 receives coexistence information from the network management apparatus 500 and verifies the coexistence information. At step S71, the command handler 511 of the base station 510 checks whether the received coexistence information is identical to the previous coexistence information.

If the received coexistence information is identical to the previous coexistence information, at step S72, the base station 510 broadcasts the existing system time to UEs and ends the procedure.

If the received coexistence information is not identical to the previous coexistence information, the base station 510 may broadcast a message containing time information corrected according to the change in the coexistence information.

Specifically, at step S73, the base station 510 checks the coexistence indicator of the coexistence information to identify the presence of WiMAX and TD-LTE coexistence. If the coexistence indicator indicates absence of coexistence, the LTE frame delay is not present. At step S74, the base station 510 generates time information for a SIB-8 message on the basis of the current time (t) (GPS reference time for SIB-8 message generation). At step S75, the base station 510 generates a SIB-8 message containing the time information represented in the synchronous system time format of FIG. 2. That is, in SystemTimeInfo of FIG. 2, cdma-EUTRA-Synchronization may be set to "true" and SynchronousSystemTime of 39 bits may be selected.

If the coexistence indicator indicates WiMAX and TD-LTE coexistence, as there is a change in the coexistence mode, at step S76, the base station 510 generates time information for the UE on the basis of a new LTE frame delay.

Specifically, the base station 510 may generate time information enabling the UE to access the CDMA network for CSFB on the basis of the changed coexistence information.

The message generator 512 of the base station 510 generates a message containing CDMA network information. The generated message may be a type of System Information Block. At step S77, the time information inserter 513 may add the time information generated by the command handler 511 to the message generated by the message generator 512.

At step S78, the base station 510 transmits the message containing the changed time information to the UE. This message may be a type of System Information Block, preferably, SIB-8.

The message of the base station 510 may be sent to a specific UE or may be broadcast to UEs.

Embodiment 3

In one embodiment of the present invention, the UE may receive time information for network access when WiMAX and TD-LTE coexist.

Figure 8:
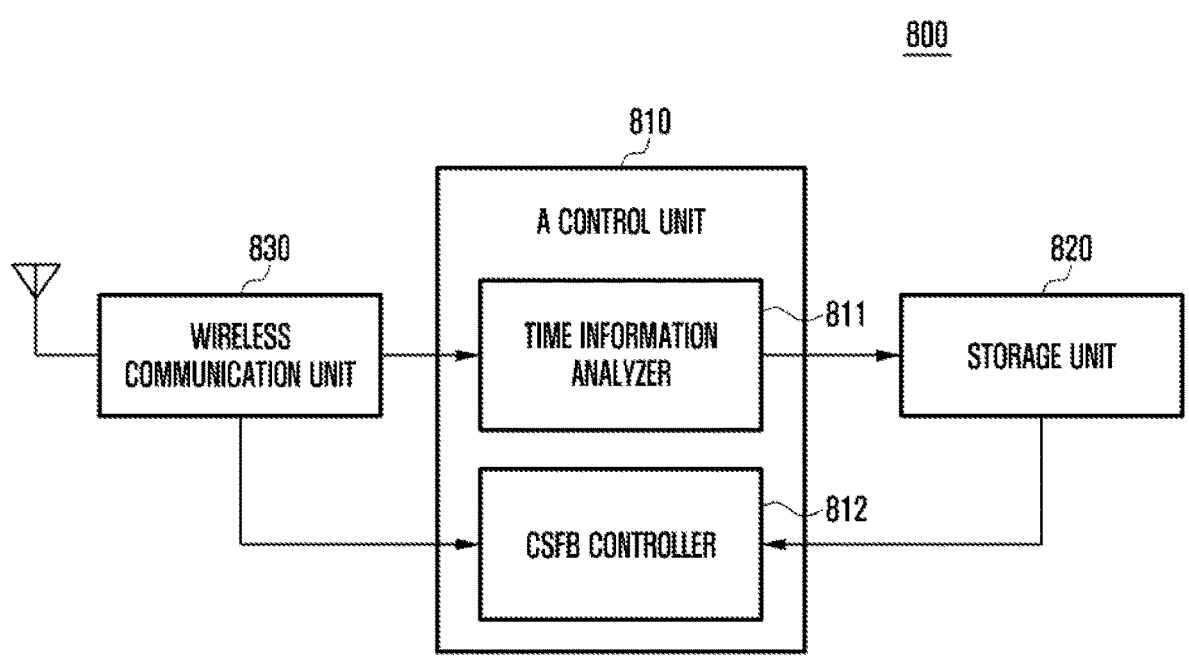
FIG. 8 illustrates the configuration of a user equipment 800 performing network access according to an embodiment of the present invention.

FIG. 8 illustrates the configuration of a user equipment 800 performing network access according to an embodiment of the present invention.

Figure 9:
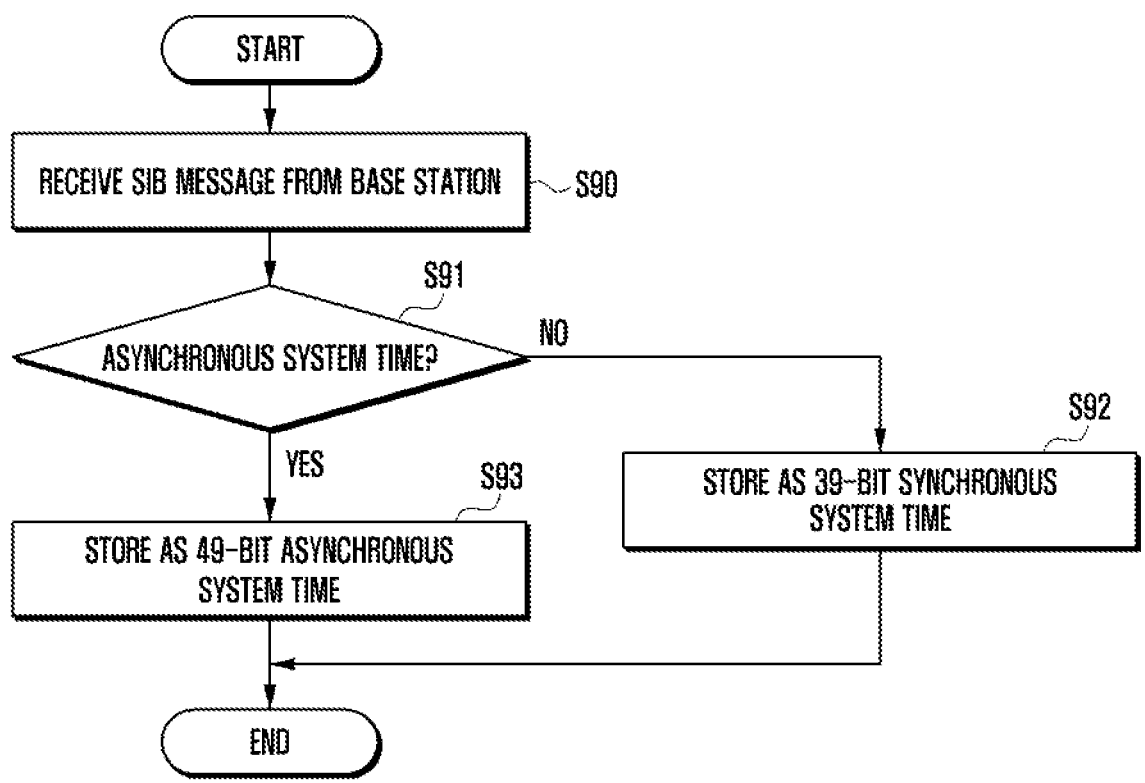
FIG. 9 is a flowchart of a procedure for the user equipment 800 to receive time information from the base station according to an embodiment of the present invention.

FIG. 9 is a flowchart of a procedure for the user equipment 800 to receive time information from the base station according to an embodiment of the present invention.

Next, a detailed description is given of a procedure for the user equipment 800 to receive time information from the base station with reference to FIGS. 8 and 9.

The UE 800 may include a wireless communication unit 830, a control unit 810, and a storage unit 820.

The control unit 810 of the UE 800 may include a time information analyzer 811 and a CSFB controller 812. In FIG. 8, some of the components of the UE 800 are shown, and other components may be added to FIG. 8.

At step S90, the wireless communication unit 830 receives a message containing time information for a network for transition from the base station.

When the CDMA network is used for voice services, the UE has to know the time information of the CDMA network to handle a voice call. The base station may provide the UE with such time information through a SIB-8 message, enabling the UE to access the CDMA network.

Upon reception of the SIB-8 message, at step S91, the time information analyzer 811 of the control unit 810 checks whether time information contained in the SIB-8 message is based on the asynchronous system time parameter.

Specifically, the time information may be represented by synchronous system time of 39 bits or asynchronous system time of 49 bits according to whether cdma-EUTRA-Synchronisation of the SIB-8 message is set to "true" or "false".

If cdma-EUTRA-Synchronisation is set to "true", at step S92, the time information analyzer 811 of the control unit 810 stores the time information as 39-bit synchronous system time in the storage unit 820 in consideration of absence of WiMAX and TD-LTE coexistence.

If cdma-EUTRA-Synchronisation is set to "false", at step S93, the time information analyzer 811 of the control unit 810 stores the time information as 49-bit asynchronous system time in the storage unit 820 in consideration of WiMAX and TD-LTE coexistence.

Figure 10:
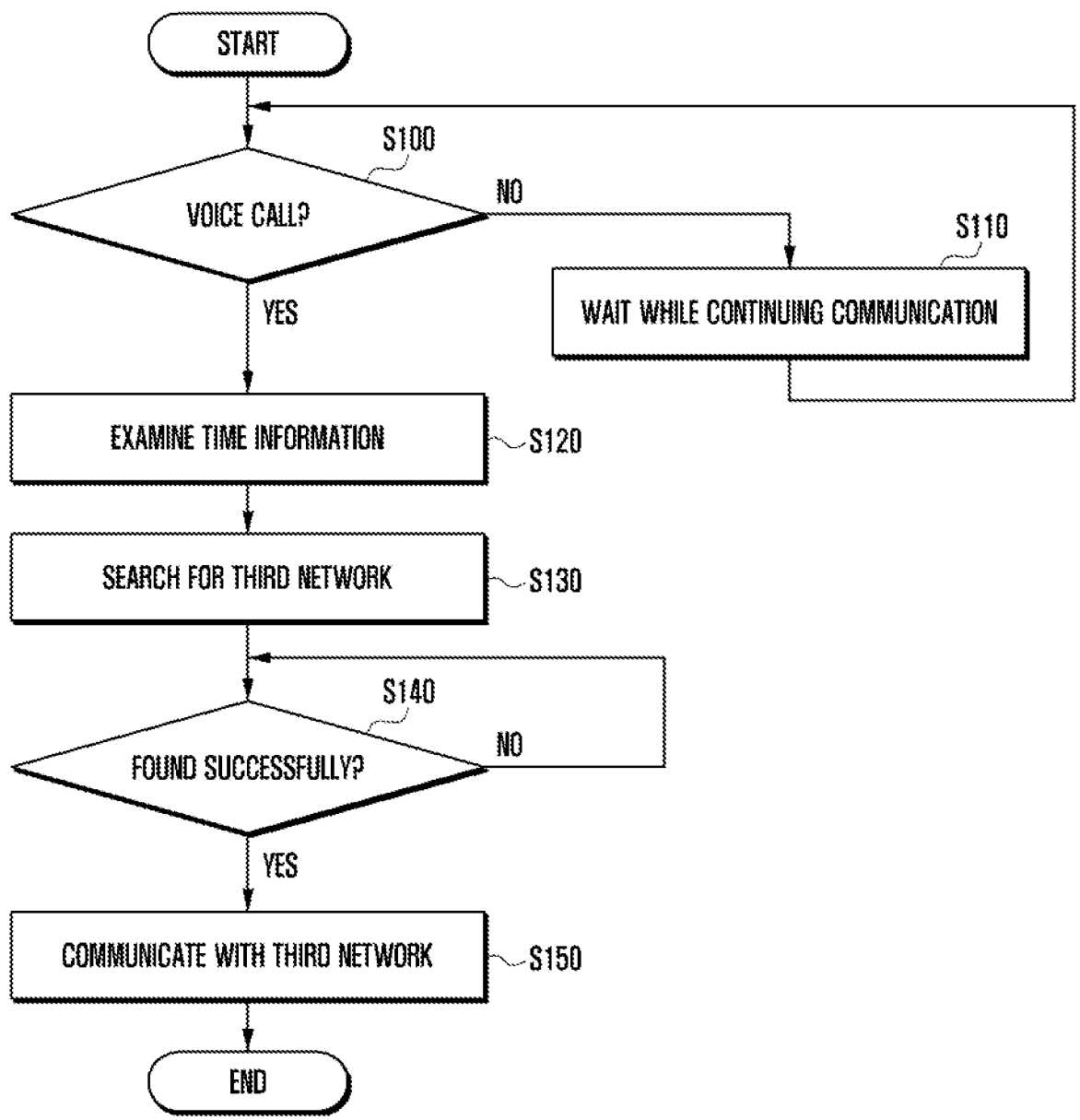
FIG. 10 illustrates a procedure for network access of the user equipment 800 when WiMAX and TD-LTE coexist according to an embodiment of the present invention.

FIG. 10 is a flowchart of a procedure for network access of the user equipment 800 when WiMAX and TD-LTE coexist according to an embodiment of the present invention.

Specifically, FIG. 10 illustrates a procedure whereby the UE 800 accesses a circuit switched network as part of CSFB by use of the time information provided by the base station managing terminals.

Referring to FIG. 10, at step S100, the UE 800 checks whether a voice call is generated. The voice call may be a mobile-originated (MO) call placed by the UE 800 or a mobile-terminated (MT) call received by the UE 800.

If a voice call is not generated, at step S110, the UE 800 may continue communication through the communication network.

If a voice call is generated, the procedure proceeds to step S120, at which the UE 800 identifies the CDMA time information stored in the storage unit 820. At step S130, the UE 800 searches for a CDMA cell in the vicinity by use of the CDMA time information. If a CDMA cell is successfully found at step S140, at step S150, the UE 800 provides a voice service through the CDMA network.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

The invention claimed is:

1. A method of a base station of a first network in a wireless communication system, the method comprising:
   identifying whether or not the first network coexists with a second network in time division duplex (TDD) system;
   in case that the first network coexists with a second network,
      determining information on a downlink/uplink (DL/UL) configuration of the second network, the information on the DL/UL configuration corresponding to a ratio of a downlink and an uplink of the second network, and
      generating asynchronous system time represented in asynchronous format for switching to a third network which provides a voice call service based on current time information and frame delay of the first network corresponding to the information on the DL/UL configuration of the second network, wherein the current time information is based on global positioning system (GPS) reference time, and wherein the frame delay is represented by a resolution of a predetermined number of code division multiple access (CDMA) chips in case that a value of the frame delay is less than a specific time value; and
   in case that the first network does not coexists with the second network,
      generating synchronous system time represented in synchronous format by the current time information being based on the GPS reference time, and
      transmitting, to a user equipment, a message including one of the asynchronous system time or the synchronous system time generated according to the identification,
   wherein the asynchronous system time or the synchronous system time is used as a correction time in case that the user equipment receives a signal from the third network.

2. The method of claim 1, wherein, in case that the first network coexists with the second network, the first network and the second network use adjacent frequencies of the same frequency band.

3. The method of claim 1,
   wherein the information comprises an indicator indicating coexistence of the first network and the second network, and
   wherein the DL/UL configuration of the second network corresponds to a ratio of DL symbols to UL symbols.

4. The method of claim 1,
   wherein the message is a system information block 8 (SIB-8) message, and
   wherein the asynchronous system time sent to the user equipment is based on an asynchronous system time parameter of the SIB-8.

5. The method of claim 4,
wherein the asynchronous system time is determined using an equation:

asynchronousSystemTime=floor((current_time($t$)+frame_delay)×1.2288×$10^6$/8)mod $2^{49}$=asynchronous_current_time($t$_asynch)+floor(frame_delay×1.2288×$10^6$/8)mod $2^{49}$, and wherein the current time is the GPS reference time at the SIB-8 generation.

6. A base station of a first network in a wireless communication system, the base station comprising:
a transceiver; and
a controller coupled with the transceiver and configured to control to:
identify whether or not the first network coexists with a second network in time division duplex (TDD) system;
in case that the first network coexists with a second network,
determine information on a downlink/uplink (DL/UL) configuration of the second network, the information on the DL/UL configuration corresponding to a ratio of a downlink and an uplink of the second network, and
generate asynchronous system time represented in asynchronous format for switching to a third network which provides a voice call service based on current time information and frame delay of the first network corresponding to the information on the DL/UL configuration of the second network, wherein the current time information is based on global positioning system (GPS) reference time, and wherein the frame delay is represented by a resolution of a predetermined number of code division multiple access (CDMA) chips in case that a value of the frame delay is less than a specific time value; and
in case that the first network does not coexists with the second network,
generate synchronous system time represented in synchronous format by the current time information being based on the GPS reference time, and
transmit a message including one of the asynchronous system time or the synchronous system time generated according to the identification to the user equipment,
wherein the asynchronous system time or the synchronous system time is used as a correction time in case that the user equipment receives a signal from the third network.

7. The base station of claim 6, wherein, in case that the first network coexists with the second network, the first network and the second network use adjacent frequencies of the same frequency band.

8. The base station of claim 6,
wherein the information comprises an indicator indicating coexistence of the first network and the second network,
wherein the DL/UL configuration of the second network corresponds to the ratio of DL symbols to UL symbols, and
wherein the message is a system information block 8 (SIB-8) message.

9. The base station of claim 8, wherein the asynchronous system time sent to the user equipment is based on an asynchronous system time parameter of the SIB-8.

10. The base station of claim 8,
wherein the asynchronous system time is determined using an equation:

asynchronousSystemTime=floor((current_time($t$)+frame_delay)×1.2288×$10^6$/8)mod $2^{49}$=asynchronous_current_time($t$_asynch)+floor(frame_delay×1.2288×$10^6$/8)mod $2^{49}$, and wherein the current time is the GPS reference time at the SIB-8 generation.

11. A method of a user equipment attached to a first network in a wireless communication system, the method comprising:
receiving, from a base station of the first network, a message including system time;
identifying whether the system time is based on an asynchronous system time parameter of a system information block 8 (SIB-8);
storing the system time in the user equipment: and
correcting time using the system time in case that a signal is received from the third network,
wherein in case that the first network coexists with a second network in time division duplex (TDD) system, the asynchronous system time represented in asynchronous format for switching to a third network which provides a voice call service is generated as the system time, based on current time information and frame delay of the first network corresponding to information on a downlink/uplink (DL/UL) configuration of the second network, by the base station,
wherein the information on the DL/UL configuration corresponds to a ratio of a downlink and an uplink of the second network, the current time information is based on global positioning system (GPS) reference time, and the frame delay is represented by a resolution of a predetermined number of code division multiple access (CDMA) chips in case that a value of the frame delay is less than a specific time value, and
wherein in case that the first network does not coexists with the second network, synchronous system time represented in synchronous format is generated as the system time, by the current time information being based on the GPS reference time, by the base station.

12. The method of claim 11, further comprising:
detecting generation of a voice call; and
performing, upon generation of a voice call, Circuit Switched Fallback (CSFB) on the basis of the stored asynchronous system time needed for accessing the third network,
wherein the performing of the CSFB comprises:
determining whether a voice call is generated on the user equipment,
examining the stored asynchronous system time in case that a voice call is generated, and
searching for a cell of the third network on the basis of the examined asynchronous system time,
wherein the voice call is a voice call placed by the user equipment or a voice call received by the user equipment,
wherein the message is a system information block (SIB)-8 message,
wherein the asynchronous system time sent to the user equipment is based on an asynchronous system time parameter of the SIB-8, wherein the asynchronous system time is determined using an equation:

asynchronousSystemTime=floor((current_time($t$)+frame_delay)×1.2288×10$^6$/8)mod 2$^{49}$=asynchronous_current_time($t$_asynch)+floor(frame_delay×1.2288×10$^6$/8)mod 2$^{49}$, and wherein the current time is the GPS reference time at the SIB-8 generation.

13. A user equipment attached to a first network in a wireless communication system, the user equipment comprising:
a transceiver; and
a controller coupled with the transceiver and configured to control to:
receive, from a base station of the first network, a message including system time,
identify whether the system time is based on an asynchronous system time parameter of a system information block 8 (SIB-8),
store the system time in the user equipment, and
correct time using the system time in case that a signal is received from the third network,
wherein in case that the first network coexists with a second network in time division duplex (TDD) system, the asynchronous system time represented in asynchronous format for switching to a third network which provides a voice call service is generated as the system time, based on current time information and frame delay of the first network corresponding to information on a downlink/uplink (DL/UL) configuration of the second network, by the base station,
wherein the information on the DL/UL configuration corresponds to a ratio of a downlink and an uplink of the second network, the current time information being based on global positioning system (GPS) reference time, and the frame delay being represented by a resolution of a predetermined number of code division multiple access (CDMA) chips in case that a value of the frame delay is less than a specific time value, and
wherein in case that the first network does not coexists with the second network, synchronous system time represented in synchronous format is generated as the system time, by the current time information being based on the GPS reference time, by the base station.

14. The user equipment of claim 13, wherein the controller is further configured to detect generation of a voice call and performs, upon generation of a voice call, Circuit Switched Fallback (CSFB) on the basis of the asynchronous system time needed for accessing the third network.

15. The user equipment of claim 14, wherein the controller is further configured to:
determine whether a voice call is generated on the user equipment, and
search for, in case that a voice call is generated, a cell of the third network on the basis of the asynchronous system time.

16. The user equipment of claim 14, wherein the voice call is a voice call placed by the user equipment or a voice call received by the user equipment.

17. The user equipment of claim 13,
wherein the message is a system information block (SIB)-8 message, and
wherein the time information sent to the user equipment is based on an asynchronous system time parameter of the SIB-8.

18. The user equipment of claim 13, wherein the time information is determined using an equation:

asynchronousSystemTime=floor((current_time($t$)+frame_delay)×1.2288×10$^6$/8)mod 2$^{49}$=asynchronous_current_time($t$_asynch)+floor(frame_delay×1.2288×10$^6$/8)mod 2$^{49}$.

* * * * *